F. PAULSEN.
TIRE CORE.
APPLICATION FILED JUNE 15, 1917.
1,269,500.
Patented June 11, 1918.
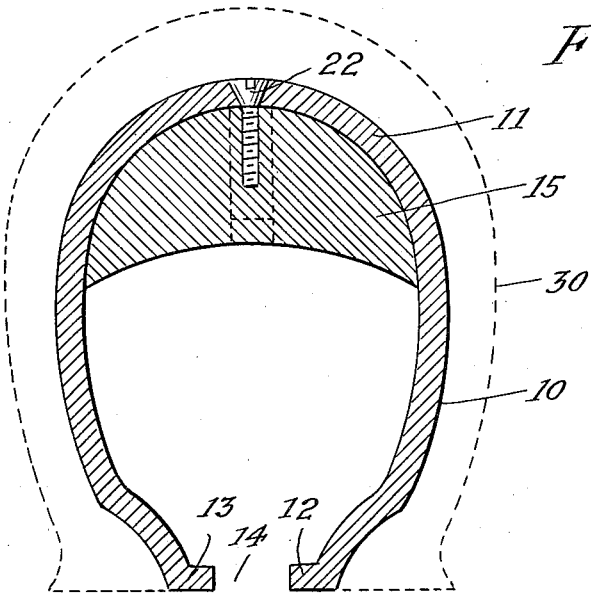
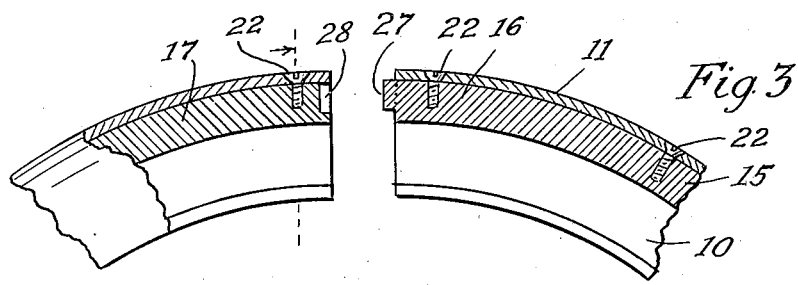
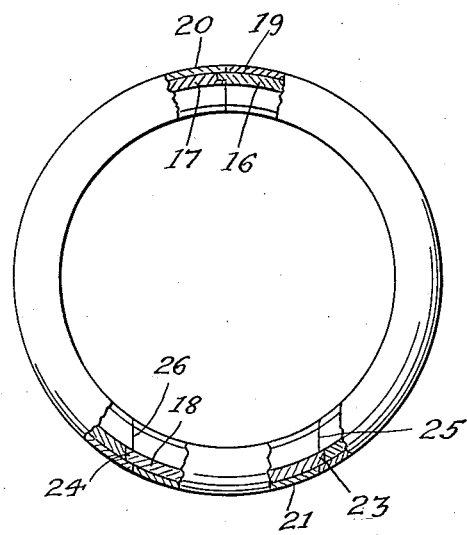
Inventor:
Frederick Paulsen
By his Attorney.

UNITED STATES PATENT OFFICE.

FREDERICK PAULSEN, OF MINNEAPOLIS, MINNESOTA.

TIRE-CORE.

1,269,500.  Specification of Letters Patent.  Patented June 11, 1918.

Application filed June 15, 1917. Serial No. 174,873.

*To all whom it may concern:*

Be it known that I, FREDERICK PAULSEN, a citizen of the United States, residing at Minneapolis, in the county of Hennepin and State of Minnesota, have invented certain new and useful Improvements in Tire-Cores, of which the following is a specification.

My invention relates to cores for forming tires and has for its object to provide a core with a portion thereof formed of spring metal so that when the clamp is applied to the core the metal may yield in certain parts thereby operating to stretch the tire held over the core and at the same time to cause the resistance to the clamp to be yielding in character.

The full objects and advantages of my invention will appear in connection with the detailed description thereof, and are particularly pointed out in the claims.

In the drawings illustrating the application of my invention in one form.

Figure 1 is a section through my core showing the position of the tire thereon. Fig. 2 illustrates the manner of forming a core in parts so that it may readily be withdrawn from the tire after the same is finished. Fig. 3 is an illustration of the joint employed.

As illustrated, the tire core comprises an outer shell 10 formed of spring metal with a tread portion 11 adapted to receive the tread of the tire, and flanges 12 and 13 normally spaced apart a suitable distance as indicated at 14.

Within the spring metal tire form 10 so as to lie inside of the tread portion 11 is a reinforcing member 15 preferably formed in three sections 16, 17 and 18, the outer member 10 being correspondingly formed in sections 19, 20 and 21, as clearly shown in Fig. 2.

The member 15 is secured to the tread 11 within the shell 10 by means of screws 22 countersunk within the tread part 11 of the shell 10 and threaded into the reinforcing member 15, as clearly indicated in Fig. 3. In this manner the sections 16, 19, 17, 20, 18 and 21 comprise integral sections of the tire core.

These sections are held together in the following manner: Section 18 of inner member 15 is provided with a pair of lugs 23 and 24 which enter corresponding open ended grooved sockets in ends of sections 16 and 17. The lines of division 25 and 26 through the shell 10 and the reinforcing member 15 which separate sections 18, 21 from sections 16, 19, and 17, 20 respectively are, as shown, slightly oblique to the diameter passing through the center of 18, 21, the obliquity being outward from said diameter toward the inside of the tire core. This enables the section 18, 21 to be drawn directly out of the tire when the same is completed, the lugs 23 and 24 being readily withdrawable from the open ended slots into which these lugs are positioned. Section 16 is provided at its end with a lug 27 which enters a closed socket 28 in the end of section 17, as shown in Fig. 3. When the several sections are brought together, as indicated in Fig. 2, with the section 18, 21 at the bottom said sections will be held locked in position and the tire core will retain its circular form for receiving the tire until the tire is completed and it is desired to remove the section. When the section 18, 21 is withdrawn the other section may be separated and easily withdrawn.

The advantages of my invention will be apparent. The tire indicated in dotted line 30, in Fig. 1, is formed in the usual manner upon the core 10 and is thereafter subjected to the pressure of a clamping device well known. This pressure results in forcing the spring metal sides of shell 10 inwardly to close the gap 14 between them. The movement inwardly of such spring metal members tends to lengthen the transverse circumferential extent of the tire with the result that the fabric is stretched over the tread portion 11 and any tendency to wrinkle or buckle is thus eliminated. At the same time the spring metal portions continue to exert pressure outwardly against that of the clamp which pressure is maintained throughout the heating or curing process.

I claim:

1. A core for tires comprising a spring metal shell and a tread filler within and secured to said shell.

2. A core for tires comprising a spring metal shell and a reinforcing member within the tread portion of said shell removably secured to the shell.

3. A tire core comprising a spring metal shell and a reinforcing member within the tread portion of the shell and secured thereto, said shell and reinforcing member being formed in sections, and means formed on the reinforcing member for holding the sections together.

4. A tire core comprising a spring metal shell and a reinforcing member within the tread portion of the shell and secured thereto, said shell and reinforcing member being formed in sections, and coöperating lugs and sockets formed on the adjacent ends of the reinforcing members for holding the sections together.

In testimony whereof I affix my signature.

FREDERICK PAULSEN.